US011624627B2

(12) United States Patent
Woo et al.

(10) Patent No.: US 11,624,627 B2
(45) Date of Patent: Apr. 11, 2023

(54) AUGMENTED REALITY DISPLAYS FOR LOCATING VEHICLES

(71) Applicant: Ford Global Technologies, LLC, Dearborn, MI (US)

(72) Inventors: Jason Woo, Northville, MI (US); Jeremy Lerner, Southfield, MI (US); Jae Hyung Lim, Canton, MI (US); Xiangrui Zeng, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

(21) Appl. No.: 16/950,890

(22) Filed: Nov. 17, 2020

(65) Prior Publication Data

US 2022/0155086 A1     May 19, 2022

(51) Int. Cl.
| | | |
|---|---|---|
| *G01C 21/36* | (2006.01) | |
| *H04W 4/024* | (2018.01) | |
| *H04W 4/02* | (2018.01) | |
| *G06Q 50/30* | (2012.01) | |

(52) U.S. Cl.
CPC ....... *G01C 21/365* (2013.01); *G01C 21/3632* (2013.01); *G01C 21/3647* (2013.01); *G06Q 50/30* (2013.01); *H04W 4/024* (2018.02); *H04W 4/026* (2013.01)

(58) Field of Classification Search
None
See application file for complete search history.

(56) References Cited

U.S. PATENT DOCUMENTS

| | | | | |
|---|---|---|---|---|
| 8,457,654 | B1 * | 6/2013 | Roskind | H04W 4/029 |
| | | | | 455/456.1 |
| 10,809,081 | B1 * | 10/2020 | Kentley-Klay | G08G 1/202 |
| 2014/0107919 | A1 * | 4/2014 | Venkatraman | G01C 21/00 |
| | | | | 701/466 |
| 2017/0343375 | A1 * | 11/2017 | Kamhi | G01C 21/20 |
| 2018/0341274 | A1 | 11/2018 | Donnelly et al. | |
| 2018/0349699 | A1 * | 12/2018 | O'Connell | G01C 21/3438 |
| 2018/0365893 | A1 * | 12/2018 | Mullins | G02B 27/0101 |
| 2019/0017839 | A1 * | 1/2019 | Eyler | G01C 21/32 |
| 2019/0065852 | A1 * | 2/2019 | Badalamenti | G06T 19/006 |
| 2021/0097866 | A1 * | 4/2021 | Leary | G08G 1/202 |

OTHER PUBLICATIONS

Malcolm Owen, "Apple looking at Augmented Reality to help ride-sharing app customers find their drivers", Apple Insider, Dec. 6, 2018, four pages.

* cited by examiner

*Primary Examiner* — Anne Marie Antonucci
*Assistant Examiner* — Kyle S Park
(74) *Attorney, Agent, or Firm* — Brandon Hicks; Eversheds Sutherland (US) LLP (57) ABSTRACT

Augmented reality displays for locating vehicles are disclosed herein. An example method includes determining a current location of a mobile device associated with a user, determining a current location of a vehicle, and generating augmented reality view data that includes a first arrow that identifies a path of travel for the ridehail user towards the vehicle. The path of travel is based on the current location of the mobile device and the current location of the vehicle. The first arrow is combined with a view obtained by a camera of the mobile device or a view obtained by a camera of the vehicle.

16 Claims, 6 Drawing Sheets

AUGMENTED REALITY DISPLAYS FOR LOCATING VEHICLES

BACKGROUND

A user can visually identify a vehicle based on generic vehicle information, such as make, model, color, and license plate number. Ridehail vehicles are frequently hard to identify, as oftentimes only a generic picture of the vehicle type and a license plate are shared with the potential rider. This can make it difficult for many users (especially ones who are unfamiliar with vehicle types) to identify their ridehail vehicle. Incorrectly identifying the ridehail vehicle can cause concerns such as accidentally getting into a car with a stranger and the inconvenience of wasted time searching for a specific car.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is generally directed to systems and methods that provide augmented reality displays that allow users to locate vehicles, and for vehicle drivers to locate users. These methods and systems can be adapted for use in ridehail scenarios. For example, a mobile device of a user can comprise a ridehail application that incorporates augmented reality features. The mobile device can create an augmented reality view based on a combination of a camera view obtained by a camera of the mobile device with augmented reality view data, such as arrows, icons, and other indications—just to name a few. The augmented reality view data can be generated at the mobile device level or by a service provider (a cloud service as an example). As similar augmented reality experience can be provided on a display of a vehicle for a ridehail driver. Using similar technology, a user can identify their vehicle in a parking lot or other location. The user can be provided with an interactive, augmented reality view that virtually guides the user to their vehicle. In addition to using augmented reality, the vehicle can be identified by way of light flashes or other vehicle actions. For example, when an authorized user approaches their designed vehicle, a light of the vehicle can activate, such as a fog lamp or puddle light(s).

The augmented reality experience can inform the user of the mobile device and/or the driver of the vehicle when the vehicle and user are converging when the vehicle and user have converged, and when the vehicle has passed the user. These features are referred to in some instances as relative position determination. Some additional features can be incorporated such as intelligent vehicle unlocking. For example, only the vehicle assigned to the user can be allowed to unlock the vehicle. In these examples, the mobile device of the user can function as a temporary phone-as-a-key (PaaK) device allowing a ridehail passenger to gain access to their ridehail vehicle.

Illustrative Embodiments

Figure 1:
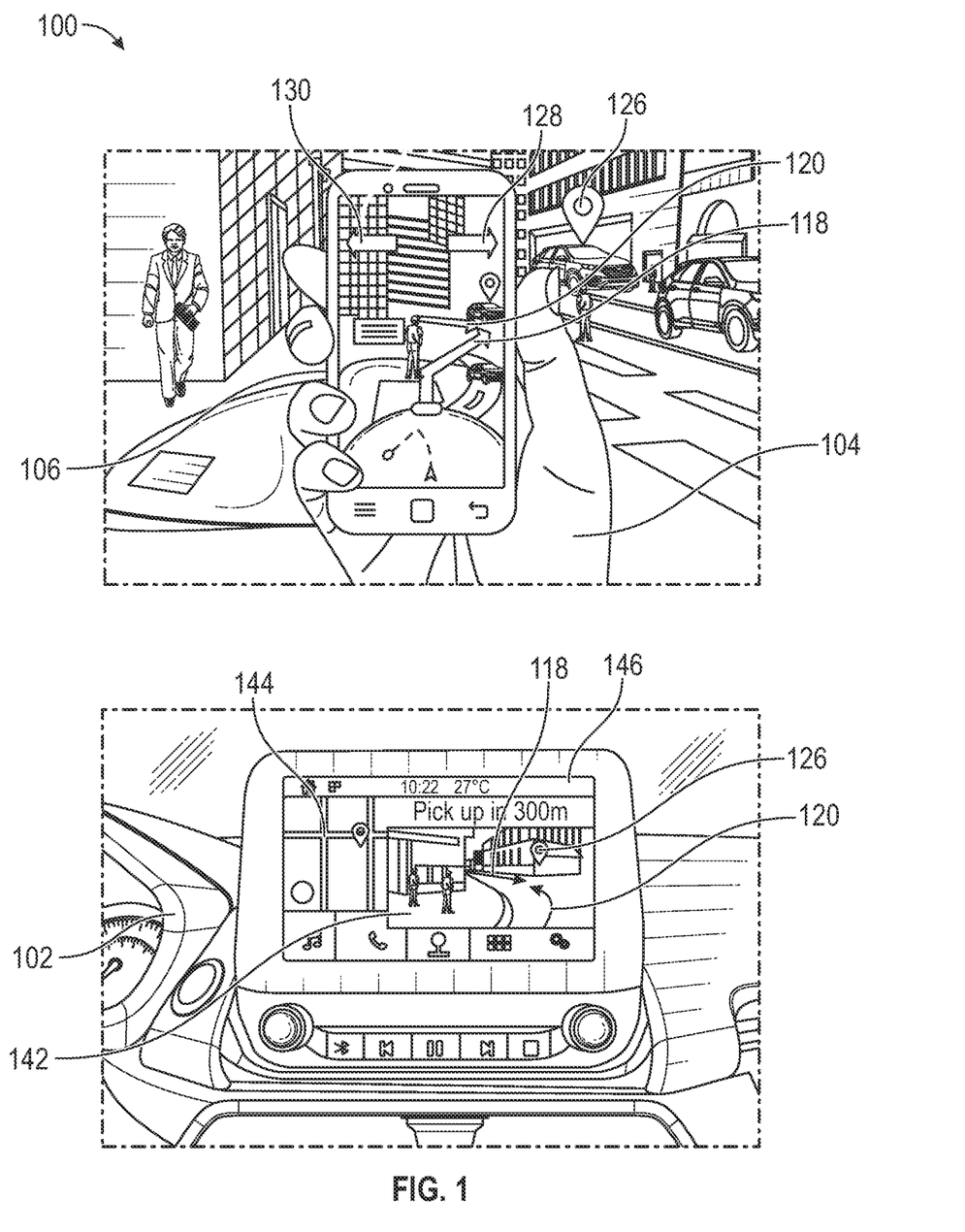
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The architecture 100 can include a vehicle 102, a user 104, a mobile device 106, a service provider 108, and a network 110. Generally, the vehicle 102, the mobile device 106, and the service provider 108 can communicate with one another over the network 110. The network 110 may include any one or a combination of multiple different types of networks, such as cable networks, the Internet, wireless networks, and other private and/or public networks. In some instances, the network 110 may include cellular, Wi-Fi, or Wi-Fi direct.

Generally, the vehicle 102 can include a legacy or an autonomous vehicle that may provide ridehail services for users, such as the user 104. The service provider 108 can facilitate and manage ridehail requests from users, allowing for users to request ridehail services and for vehicles to respond to ridehail requests.

Broadly, augmented reality experiences for both the user 104 and a driver of the vehicle 102 are disclosed herein. In some use cases, the augmented reality experience is created and presented at the mobile device 106. In some use cases, the augmented reality experience is created and presented at the vehicle 102. In some use cases, the augmented reality experience is created cooperatively between the service provider 108 along with the mobile device 106 and/or the vehicle 102. In some instances, the vehicle 102 and the mobile device 106 can each be provisioned with a ridehail application that provides an augmented reality experience.

The mobile device 106 can be provisioned with a processor 112 and memory 114 that stores an augmented reality (AR) ridehail application 116. The processor 112 can execute the ridehail application 116 to provide an augmented reality experience in accordance with the present disclosure. The augmented reality experience can be provided within the context of a ridehail service, for example. As noted above, the mobile device 106 using the ridehail application 116 can manage ridehail requests and provide an augmented reality experience to the user 104. The processor 112 can execute the ridehail application 116 to determine a current location of the mobile device 106 from, for example, compass data (e.g., magnet-based heading determination), and GPS (Global Positioning System) data that can include latitude, longitude, and motion-based heading data. Similar current location of the vehicle 102 can be requested by the mobile device 106 from the vehicle 102. The vehicle 102 can respond to the request with the requested data. The data obtained from the vehicle 102 can include but is not limited to steering wheel angle, speed, heading, and GPS data.

The processor 112 can execute the ridehail application 116 to compare the current location of the vehicle 102 with the current location of the mobile device 106. Once the vehicle 102 and the mobile device 106 are within a specified distance from one another, such as 200 yards, the ridehail application 116 can begin to provide an augmented reality experience on the mobile device 106. The specified distance can include any desired distance (see FIG. 2 for example).

Generally, the augmented reality experience can be based on augmented reality view data. In a first example, the augmented reality view data can include a first arrow 118 that identifies a path of travel for the user towards the vehicle 102. The first arrow 118 can be superimposed or otherwise combined into a view 142 obtained by a camera 122 of the mobile device 106. As the mobile device 106 and the vehicle 102 converge (at a pickup location for example), the ridehail application 116 can increase a refresh rate for the first arrow 118. In some instances, the refresh rate increase can be triggered by the selection of the user 104 or the driver of the vehicle 102. A similar refresh rate update can occur at the vehicle 102. Additional details on vehicle 102 operations/features are provided infra.

The augmented reality view data can further include a second arrow 120 that identifies a path of travel for the vehicle towards the user 104. In some configurations, the first arrow 118 and the second arrow 120 can be included in the augmented reality experience and converge on an icon 126. The icon 126 can include a designated pickup location where the user 104 and the vehicle 102 are to meet.

A high refresh rate and an established link between the mobile device 106 and the vehicle 102 could be selectively adjusted during these times where the mobile device 106 and the vehicle 102 are close to one another. The driver and/or user can specify that they are ready to search for one another. In response, a data refresh rate can be updated for a short period (e.g., a selectable period of time such as five minutes). Alternatively, the refresh rate can increase when the current location of the vehicle 102 and user 104 are close to one another. While examples above referenced 200 yards, the specific distance can be selected as desired.

The augmented reality experience provided by the ridehail application 116 can display the first arrow 118 as a walking path to get to the vehicle 102, highlighting the vehicle 102 in an augmented image, and providing a path on the road that is the expected path of the vehicle based on vehicle data disclosed above such as steering wheel angle, speed, heading, and current GPS data. In some instances, the first arrow 118 and/or the second arrow 120 can be superimposed over a street or sidewalk that directs the user 104 to a specified location. The appearance of both or either of the first arrow 118 and the second arrow 120 can be based on the vehicle data. The first arrow 118 and the second arrow 120 can each be provided with a specific hue or color that allows driver and user to easily distinguish the user's designated walking path from the vehicle's expected route.

The augmented reality view data can also include directional arrows 128 and 130, with arrow 128 pointing to the left and arrow 130 pointing to the right. When the user 104 lifts the mobile device 106 into position in front of their face, the user can scan the area with the mobile device 106. If the vehicle 102 is located to the right of the mobile device 106, the arrow 128 can illuminate. If the vehicle 102 is located to the left of the mobile device 106, the arrow 130 can illuminate.

In addition to including augmented reality view data, the ridehail application 116 can be configured to display advertisements. Advertisements for partnering businesses can also be placed in the augmented reality experience in real-time (perhaps highlighting the banner of a restaurant or offering a coupon for the restaurant). Advertising in this context may likely be more effective, as the user is frequently looking at their mobile device 106 during the augmented reality experience.

Figure 2:
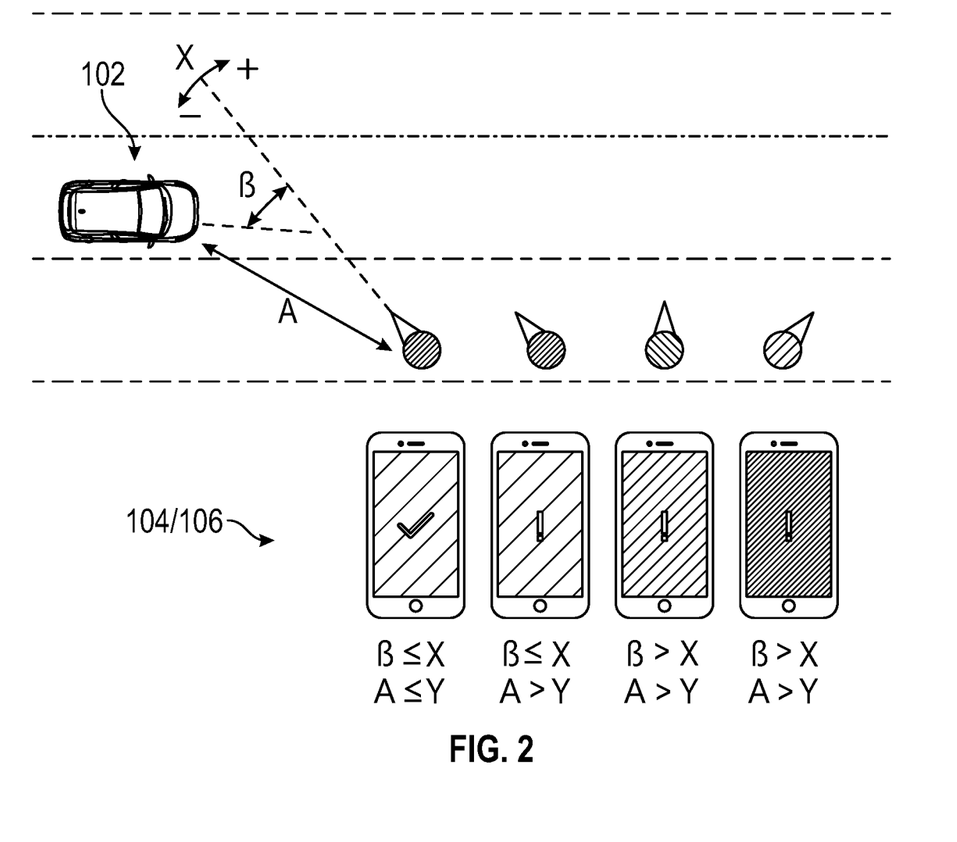
FIG. 2 schematically illustrates relative orientation determinations between a vehicle and a mobile device.

The ridehail application 116 can be configured to determine and display data related to a relative orientation between the vehicle 102 and mobile device 106. As illustrated in FIG. 2, various scenarios are depicted where the mobile device 106 and the vehicle 102 are close to one another. For example, the mobile device 106 and the vehicle 102 may be within 300 feet of one another when the relative orientation feature can be engaged. Again, the exact distance is not intended to be limiting and can include any desired distance. When the mobile device 106 and the vehicle 102 are within a specified distance from one another, the ridehail application 116 can be configured to determine relative orientation between the vehicle and the mobile device 106, specifically determining when the mobile device 106 is pointing in a direction of the vehicle 102. That is, this feature can allow a driver of the vehicle 102 to determine proximity or closeness of the vehicle 102 to the user, as well as determine that the mobile device 106 is pointed at the vehicle 102. When the mobile device 106 is ahead of the vehicle 102, a first type of indication on the mobile device to indicate this type of relative orientation and mobile device directionality. That is, when the vehicle 102 is close and the mobile device 106 is pointed at the vehicle, a first indication, such as a checkmark can be displayed on the mobile device 106. The checkmark can be displayed against a specifically colored background, such as a green background. In some configurations, an icon, such as a green checkmark could be displayed in the augmented reality experience illustrated in FIG. 1, on the mobile device 106. If the vehicle 102 is too far away from the mobile device 106, the first type of indication could be an exclamation point.

If the vehicle 102 continues to advance towards the mobile device 106, the first type of indication could change into the check mark, when the mobile device 106 is properly oriented relative to the vehicle 102. The exclamation point can be displayed against a specifically colored background, such as an orange background. In some configurations, an icon, such as an orange exclamation point could be displayed in the augmented reality experience illustrated in FIG. 1, on the mobile device 106. Generally, the second type of indication can be displayed when the mobile device 106 is substantially aligned with the vehicle 102.

In some configurations, an icon, such as a red exclamation point could be displayed in the augmented reality experience illustrated in FIG. 1, on the mobile device 106. Generally, the second type of indication can be displayed when the relative orientation indicates that vehicle 102 and the mobile device 106 are not close to one another or that the angle of the mobile device 106 is pointed away from the vehicle 102.

The relative orientation of the vehicle 102 to the mobile device 106 can be determined from a defined angular threshold X and a defined distance threshold Y. When an actual distance A between the vehicle 102 and mobile device 106 is less than or equal to the defined distance threshold Y, and an actual angle $\beta$ between the vehicle 102 and mobile device 106 is less than or equal to the defined angular threshold X, the vehicle 102 and mobile device 106 are considered to be in a preferred relative orientation. This preferred relative orientation includes when the vehicle 102 and the mobile device 106 are spaced apart so that the user 104 can view the front license plate of the vehicle 102. The vehicle 102 and mobile device 106 are considered to be in a non-preferred relative orientation when the vehicle has passed the mobile device 106. To be sure, these preferred relative orientations and non-preferred relative orientations are provided as examples and a user could select preferences that determine their preferred relative orientations.

The driver can also be given an augmented reality image that highlights the driving path to the rider, the rider, and the rider's current walking path. The driver's augmented reality image can be based on vehicle ADAS cameras and can be displayed on a vehicle heads up display. A driver's notification can be provided visually (in a heads up display, in the instrument cluster, on the sync screen, and so forth) or given audibly, perhaps beeping more frequently as the driver approaches the rider. Referring briefly back to FIG. 1, the vehicle 102 can include a controller 132, a human-machine interface (HMI) 134 such as an infotainment system, and camera 136, which could be a camera of an advanced driver assistance system (ADAS). The controller 132 can comprise a processor 138 and a memory 140 for storing instructions. The processor 138 executes the instructions stored in memory 140 to provide the driver of the vehicle 102 with an augmented reality experience.

In general, the controller 132 can cause the display of an augmented reality experience on the HMI 134. The augmented reality experience can include a map 144 in combination with the augmented reality experience. The augmented reality experience can include a view 142 obtained by the camera 136. The view 142 is combined with augmented reality view data that includes the first arrow 118 and the second arrow 120, as well as the icon 126. A distance indication 146 can be displayed that indicates to the driver an actual distance between the vehicle 102 and the user 104/mobile device 106.

The controller 132 can be configured to allow the user 104 to utilize the mobile device 106 as a key to gain access to the vehicle 102. In one example, the service provider 108 can transmit a one-time or single-use authorization to the mobile device 106 that allows the user 104 to unlock a door of the vehicle 102. Thus, when the vehicle 102 is equipped with PaaK technology, a rider can be allowed to unlock vehicle doors at the beginning of a ride. This allows the driver to properly identify the passenger. This further allows rideshare drivers to keep their doors locked until the correct rider is about to enter the vehicle and further helps the rider identify the vehicle, as the vehicle should automatically recognize the rider as they approach. The rider can furthermore specifically identify the vehicle using the Phone as a Key technology in that puddle lamps can illuminate or approach lighting can guide the rider from their current location (based on their phone's location and transmitted to the vehicle via Bluetooth) directly to the door of the vehicle.

In another use case, the present disclosure can be extended for use in finding parked vehicles in large parking lots. Upon request, the controller 132 can briefly activate a communication interface 148 when the vehicle 102 is parked to establish GPS coordinates (or this can be logged in when the vehicle is parked and just before or just after it is powered off). The location information can be transmitted either directly or indirectly to the mobile device 106. An augmented reality experience can be used to guide the user 104 to the parked vehicle 102 using the mobile device 106. This can be further applied to rented vehicles and commercial vehicles, where the driver wasn't necessarily the person who parked the vehicle in its current location.

Figure 3:
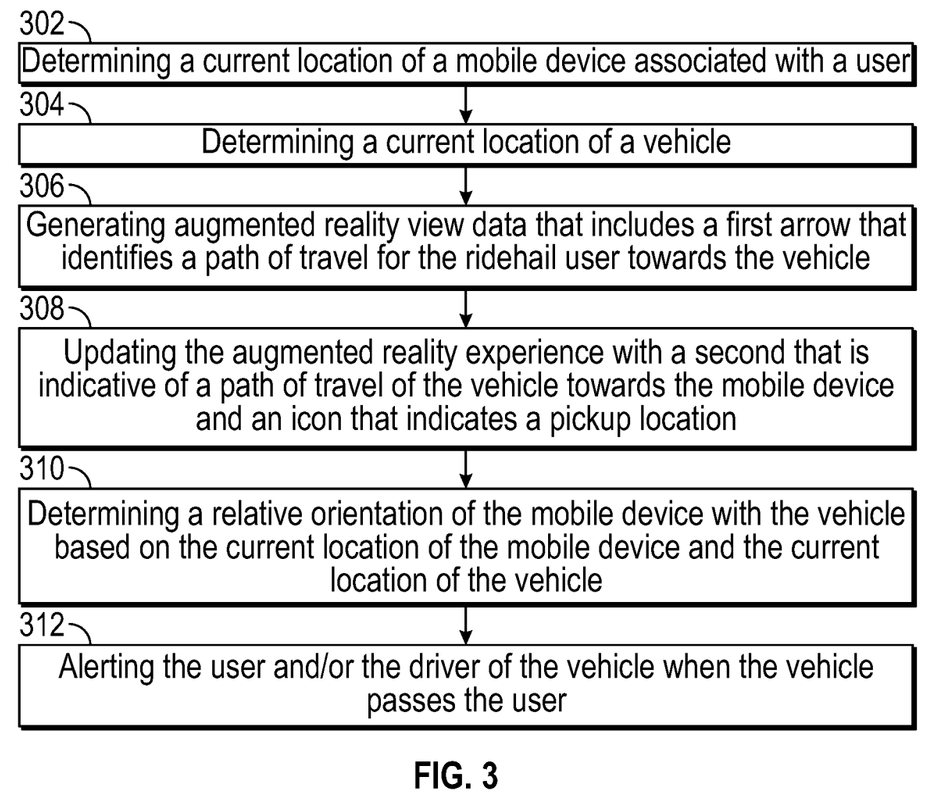
FIG. 3 is an example method of the present disclosure for providing an augmented reality experience.

FIG. 3 is a flowchart of an example method of the present disclosure. The method can include a step 302 of determining a current location of a mobile device associated with a user. The current location can include position and location information, as well as the direction of travel if the user is moving.

The method can also include a step 304 of determining a current location of a vehicle. The current location can include position and location information, as well as steering wheel angle, a speed, a heading for the vehicle. The method can include a step 306 of generating augmented reality view data that includes a first arrow that identifies a path of travel for the ridehail user towards the vehicle. To be sure, the path of travel may be based on the current location of the mobile device and the current location of the vehicle. The first arrow can be combined with a view obtained by a camera of the mobile device or a view obtained by a camera of the vehicle to create an augmented reality experience for the mobile device user. To be sure, a corresponding augmented reality experience can also be created for the driver of a vehicle.

The method can include a step 308 of updating the augmented reality experience with a second that is indicative of a path of travel of the vehicle towards the mobile device and an icon that indicates a pickup location. In some instances, these two arrows can converge on the icon in the augmented reality experience.

When the vehicle is approaching the user, the method can further include a step 310 of determining a relative orientation of the mobile device with the vehicle based on the current location of the mobile device and the current location of the vehicle. The method can include a step 312 of alerting the user and/or the driver of the vehicle when the vehicle passes the user.

Figure 4:
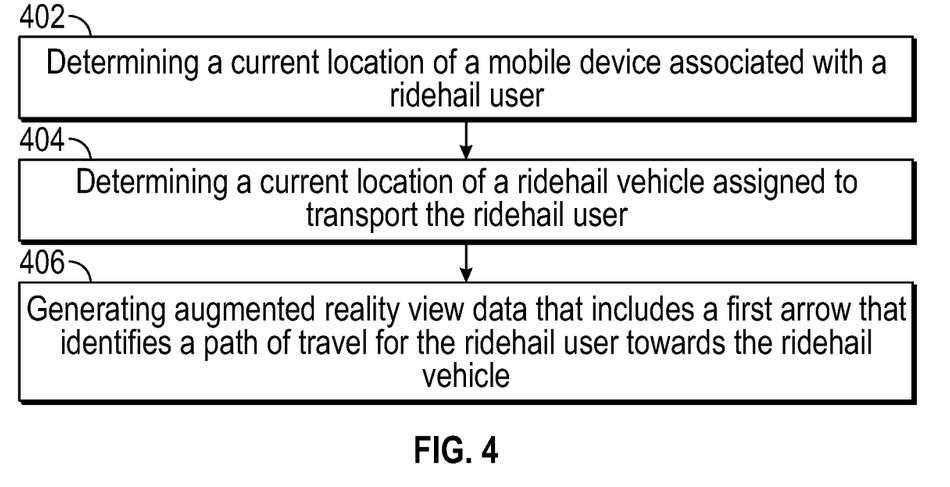
FIG. 4 is another example method of the present disclosure for providing an augmented reality experience.

FIG. 4 is a flowchart of another example method. The method can include a step 402 of determining a current location of a mobile device associated with a ridehail user. The method can further include a step 404 of determining a current location of a ridehail vehicle assigned to transport the ridehail user.

The method can include a step 406 of generating augmented reality view data that includes a first arrow that identifies a path of travel for the ridehail user towards the ridehail vehicle. The path of travel is based on the current location of the mobile device and the current location of the ridehail vehicle. The first arrow can be combined with a view obtained by a camera of the mobile device or a view obtained by a camera of the ridehail vehicle.

Figure 5:
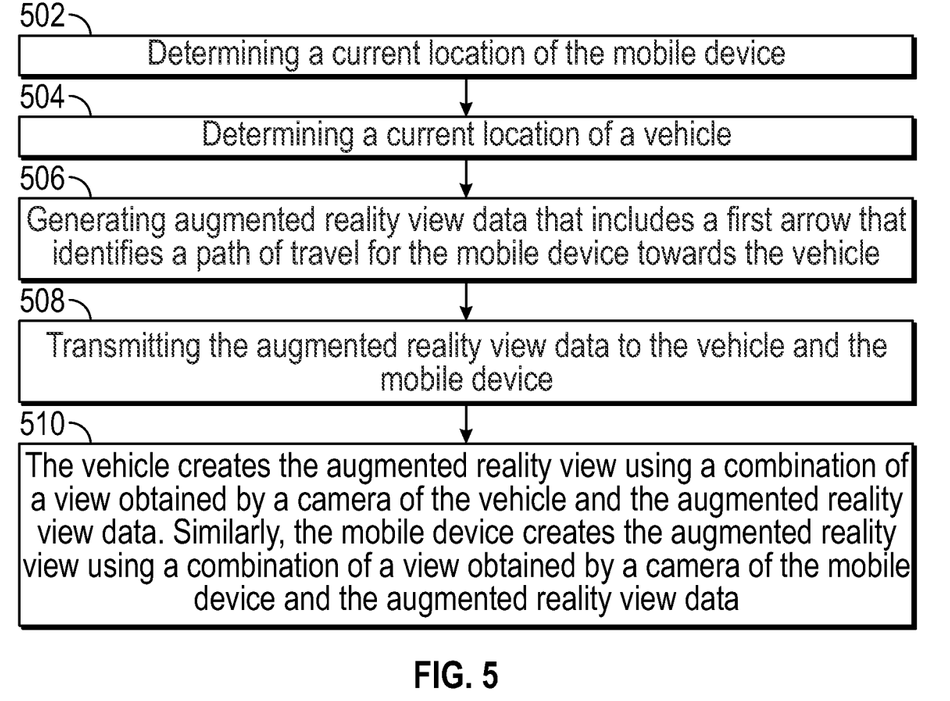
FIG. 5 is yet another example method of the present disclosure for providing an augmented reality experience.

FIG. 5 is another flowchart of an example method of the present disclosure. The method can be performed by an example service provider system. The method can include a step 502 of determining a current location of the mobile device. This can include the service providing and receiving current location data from the mobile device over a network. The method can include a step 504 of determining a current location of a vehicle. Again, the service provider can receive this current location information over a network.

Next, the method can include a step 506 of generating augmented reality view data that includes a first arrow that identifies a path of travel for the mobile device towards the vehicle. Again, the path of travel is based on the current location of the mobile device and the current location of the vehicle. The method can further include a step 508 of transmitting the augmented reality view data to the vehicle and the mobile device. In step 510, the vehicle creates the augmented reality view using a combination of a view obtained by a camera of the vehicle and the augmented reality view data. Similarly, the mobile device creates the augmented reality view using a combination of a view obtained by a camera of the mobile device and the augmented reality view data.

In general, the augmented reality view data comprises a second arrow that is indicative of a path of travel of the vehicle towards the mobile device, and an icon that is indicative of a pickup location, wherein the first arrow and the second arrow converge on the icon in the augmented reality view.

The service provider can be configured to determine relative orientation of the mobile device with the vehicle based on the current location of the mobile device and the current location of the vehicle. The service provider can be configured to determine a current location of a vehicle by: (1) transmitting a request to the vehicle to determine the current location of the vehicle; (2) receiving the current location of the vehicle in response to the request; and (3) transmitting the current location of the vehicle to the mobile device.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions are computer storage media (devices). Computer-readable media that carry computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid-state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   determining a current location of a mobile device associated with a user;
   determining a current location of a vehicle;
   generating augmented reality view data that includes a first arrow that identifies a path of travel for the user towards the vehicle, wherein the path of travel is based on the current location of the mobile device and the current location of the vehicle, wherein the first arrow is combined with a view obtained by a camera of the mobile device or a view obtained by a camera of the vehicle;
   displaying the augmented reality view data on a user interface of the mobile device;
   increasing a refresh rate associated with display of the first arrow on the user interface as the user approaches the vehicle;
   determining a relative orientation of the mobile device with the vehicle based on the current location of the mobile device and the current location of the vehicle;
   display a first type of augmented reality icon and first background color on the mobile device when the relative orientation indicates that the mobile device is ahead of the vehicle;
   displaying a second type of augmented reality icon and second background color on the mobile device when the relative orientation indicates that the mobile device is substantially aligned with the vehicle, wherein the second type of augmented reality icon comprises a changeable icon; and
   activating a component of the vehicle as the user approaches the vehicle.

2. The method according to claim 1, further comprising:
   determining a second arrow for the augmented reality view data that is indicative of a path of travel of the vehicle towards the mobile device, wherein an appearance of the first arrow or the second arrow is based on a steering wheel angle, a speed, a heading, and the current location of the vehicle; and
   displaying both the first arrow and the second arrow on the user interface of the mobile device.

3. The method according to claim 2, further comprising determining an icon for the augmented reality view data that is indicative a pickup location, wherein the first arrow and the second arrow converge on the icon in an augmented reality view.

4. The method according to claim 1, wherein determining the first type of augmented reality icon for display on the mobile device is further based on the mobile device not being pointed towards the vehicle.

5. The method according to claim 4, wherein determining the second type of augmented reality icon for display on the mobile device is further based on the mobile device being pointed towards the vehicle.

6. The method according to claim 5, further comprising determining a third type of indication for display on the mobile device when the relative orientation indicates that the vehicle has passed by the mobile device and that the mobile device is not pointed towards the vehicle, wherein the relative orientation indicating that the vehicle has passed by the mobile device comprises an angle between the vehicle and the mobile device being less than or equal to a predefined angular threshold.

7. The method according to claim 6, wherein when the vehicle has passed by the mobile device, the first arrow is again displayed on the mobile device to identify the path of travel for the user towards the vehicle.

8. A device, comprising:
   a processor; and
   a memory for storing instructions, the processor executes the instructions to:
      determine a current location of a mobile device associated with a ridehail user;
      determine a current location of a ridehail vehicle assigned to transport the ridehail user;
      generate augmented reality view data that includes a first arrow that identifies a path of travel for the ridehail user towards the ridehail vehicle, wherein the path of travel is based on the current location of the mobile device and the current location of the ridehail vehicle, wherein the first arrow is combined with a view obtained by a camera of the mobile device or a view obtained by a camera of the ridehail vehicle;
      display the augmented reality view data on a user interface of the mobile device;
      increase a refresh rate associated with the first arrow as the ridehail user approaches the ridehail vehicle;

determine a relative orientation of the mobile device with the ridehail vehicle based on the current location of the mobile device and the current location of the ridehail vehicle;

display a first type of augmented reality icon and first background color on the mobile device when the relative orientation indicates that the mobile device is ahead of the ridehail vehicle;

display a second type of augmented reality icon and second background color on the mobile device when the relative orientation indicates that the mobile device is substantially aligned with the ridehail vehicle, wherein the second type of augmented reality icon comprises a changeable icon; and activate a component of the ridehail vehicle as the ridehail user approaches the ridehail vehicle.

9. The device according to claim 8, wherein the processor is configured to transmit the augmented reality view data to the ridehail vehicle for display.

10. The device according to claim 8, wherein the processor is configured to display a second arrow in an augmented reality view that is indicative of a path of travel of the ridehail vehicle towards the mobile device, wherein an appearance of the first arrow or the second arrow is based on a steering wheel angle, a speed, a heading, and the current location of the ridehail vehicle.

11. The device according to claim 10, wherein the processor is configured to display an icon in the augmented reality view that is indicative a pickup location, wherein the first arrow and the second arrow converge on the icon in the augmented reality view.

12. The device according to claim 8, wherein when the ridehail vehicle has passed by the mobile device, the first arrow is again displayed on the mobile device to identify the path of travel for the ridehail user towards the ridehail vehicle.

13. A system, comprising:
a vehicle having a display that is configured to display an augmented reality view;
a mobile device that is configured to display the augmented reality view; and
a cloud service configured to:
determine a current location of the mobile device;
determine a current location of the vehicle;
generate augmented reality view data that includes a first arrow that identifies a path of travel for the mobile device towards the vehicle, wherein the path of travel is based on the current location of the mobile device and the current location of the vehicle;
transmit the augmented reality view data to the vehicle and the mobile device, wherein the vehicle creates the augmented reality view using a combination of a view obtained by a camera of the vehicle and the augmented reality view data, and wherein the mobile device creates the augmented reality view using a combination of a view obtained by a camera of the mobile device and the augmented reality view data;
increase a refresh rate associated with the first arrow as a user approaches the vehicle;
determine a relative orientation of the mobile device with the vehicle based on the current location of the mobile device and the current location of the vehicle;
display a first type of augmented reality icon and first background color on the mobile device when the relative orientation indicates that the mobile device is ahead of the vehicle;
display a second type of augmented reality icon and second background color on the mobile device when the relative orientation indicates that the mobile device is substantially aligned with the vehicle, wherein the second type of augmented reality icon comprises a changeable icon;
display a third type of augmented reality icon and third background color on the mobile device when the relative orientation indicates that the vehicle has passed by the mobile device, wherein the relative orientation indicating that the vehicle has passed by the mobile device comprises an angle between the vehicle and the mobile device being less than or equal to a predefined angular threshold; and
activate a component of the vehicle as the user approaches the vehicle.

14. The system according to claim 13, wherein the augmented reality view data comprises:
a second arrow that is indicative of a path of travel of the vehicle towards the mobile device, wherein an appearance of the first arrow or the second arrow is based on a steering wheel angle, a speed, a heading, and the current location of the vehicle; and
an icon that is indicative a pickup location, wherein the first arrow and the second arrow converge on the icon in the augmented reality view.

15. The system according to claim 13, wherein the cloud service is configured to determine the current location of the vehicle by:
transmitting a request to the vehicle determine the current location of the vehicle;
receiving the current location of the vehicle in response to the request; and
transmitting the current location of the vehicle to the mobile device.

16. The system according to claim 15, wherein the request causes the vehicle to wake and transmit the current location.

* * * * *